United States Patent
Cronin et al.

(10) Patent No.: US 9,417,090 B2
(45) Date of Patent: *Aug. 16, 2016

(54) SYSTEM TO OFFER COUPONS TO FANS ALONG ROUTES TO GAME

(71) Applicant: ProSports Technologies, LLC, Miami, FL (US)

(72) Inventors: John E. Cronin, Bonita Springs, VT (US); Christopher Michael Huffines, Williston, VT (US); Nick Reasner, Chicago, IL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/836,307

(22) Filed: Aug. 26, 2015

(65) Prior Publication Data
US 2016/0076907 A1    Mar. 17, 2016

Related U.S. Application Data

(60) Provisional application No. 62/048,936, filed on Sep. 11, 2014.

(51) Int. Cl.
G01C 21/36 (2006.01)
G06Q 30/02 (2012.01)

(52) U.S. Cl.
CPC .......... *G01C 21/3697* (2013.01); *G01C 21/362* (2013.01); *G06Q 30/0255* (2013.01); *G06Q 30/0259* (2013.01)

(58) Field of Classification Search
CPC ............. G01C 21/3697; G01C 21/362; G06Q 30/0255; G06Q 30/0259
USPC ........................................................ 701/533
See application file for complete search history.

(56) References Cited

U.S. PATENT DOCUMENTS

| | | |
|---|---|---|
| 4,962,466 A | 10/1990 | Revesz et al. |
| 5,189,630 A | 2/1993 | Barstow et al. |
| 7,715,723 B2 | 5/2010 | Kagawa et al. |
| 7,848,765 B2 | 12/2010 | Phillips et al. |

(Continued)

FOREIGN PATENT DOCUMENTS

| | | |
|---|---|---|
| CN | 102843186 | 12/2012 |
| WO | WO 2008/070184 | 6/2008 |

(Continued)

OTHER PUBLICATIONS

Huang et al., Can Keywords Help Personalized Recommendation for Coupon Deals?, 2014, IEEE, p. 656-659.*

(Continued)

*Primary Examiner* — McDienuel Marc
(74) *Attorney, Agent, or Firm* — Polsinelli LLP (57) ABSTRACT

The systems and methods are directed towards embodiments for planning a travel route for a user (i.e. fan) who is planning to attend a sports game. The systems and methods will plan/map a route for the user from a start position (e.g., home) to the location of the sports game (e.g., stadium). Alongside the planned/mapped route, the systems and methods will also obtain various related deals (e.g., coupons) for one or more business (i.e. retail stores, fast-food) along the planned/mapped route. The various related deals can then be displayed for the user to view or use.

17 Claims, 6 Drawing Sheets

(56) References Cited

U.S. PATENT DOCUMENTS

| | | |
|---|---|---|
| 8,321,278 B2 | 11/2012 | Haveliwala et al. |
| 8,391,773 B2 | 3/2013 | Arseneau et al. |
| 8,483,674 B2 | 7/2013 | Ramer et al. |
| 8,495,675 B1 | 7/2013 | Philpott et al. |
| 8,527,340 B2 | 9/2013 | Fisher et al. |
| 8,539,523 B2 | 9/2013 | Philpott et al. |
| 8,565,735 B2 | 10/2013 | Wohlwend et al. |
| 8,578,408 B2 | 11/2013 | Tom et al. |
| 8,589,667 B2 | 11/2013 | Mujtaba et al. |
| 8,611,677 B2 | 12/2013 | Das et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,043,222 B1 | 5/2015 | Kerr et al. |
| 2002/0094787 A1 | 7/2002 | Avnet et al. |
| 2003/0033318 A1 | 2/2003 | Carlbom et al. |
| 2004/0220854 A1 | 11/2004 | Postrel |
| 2006/0015404 A1 | 1/2006 | Tran |
| 2008/0201227 A1 | 8/2008 | Bakewell |
| 2008/0300984 A1 | 12/2008 | Li |
| 2009/0089838 A1 | 4/2009 | Pino, Jr. et al. |
| 2009/0262137 A1 | 10/2009 | Walker et al. |
| 2010/0114679 A1 | 5/2010 | Pan |
| 2010/0129087 A1 | 5/2010 | Kim et al. |
| 2010/0180297 A1 | 7/2010 | Levine et al. |
| 2011/0202397 A1 | 8/2011 | Lam et al. |
| 2011/0238497 A1 | 9/2011 | Milne et al. |
| 2012/0167132 A1 | 6/2012 | Mathews et al. |
| 2012/0290336 A1 | 11/2012 | Rosenblatt et al. |
| 2012/0297417 A1 | 11/2012 | Philpott et al. |
| 2012/0316843 A1 | 12/2012 | Beno et al. |
| 2012/0316963 A1 | 12/2012 | Moshfeghi |
| 2013/0024284 A1 | 1/2013 | Droznin et al. |
| 2013/0063646 A1 | 3/2013 | Ueno et al. |
| 2013/0126713 A1 | 5/2013 | Haas et al. |
| 2013/0141555 A1 | 6/2013 | Ganick et al. |
| 2013/0218612 A1 | 8/2013 | Hunt |
| 2013/0250119 A1 | 9/2013 | Xu |
| 2013/0271602 A1 | 10/2013 | Bentley et al. |
| 2013/0279917 A1 | 10/2013 | Son et al. |
| 2013/0303192 A1 | 11/2013 | Louboutin |
| 2013/0317835 A1 | 11/2013 | Mathew |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0332965 A1 | 12/2013 | Seyller et al. |
| 2013/0336662 A1 | 12/2013 | Murayama et al. |
| 2013/0343762 A1 | 12/2013 | Murayama et al. |
| 2014/0018109 A1 | 1/2014 | Ortiz et al. |
| 2014/0062773 A1 | 3/2014 | MacGougan |
| 2014/0065962 A1 | 3/2014 | Le |
| 2014/0071221 A1 | 3/2014 | Dave |
| 2014/0105084 A1 | 4/2014 | Chhabra |
| 2014/0130076 A1 | 5/2014 | Moore et al. |
| 2014/0139380 A1 | 5/2014 | Ouyang |
| 2014/0141803 A1 | 5/2014 | Marti |
| 2014/0156375 A1 | 6/2014 | Vaughan et al. |
| 2014/0156410 A1 | 6/2014 | Wuersch et al. |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0011242 A1 | 1/2015 | Nagaraj |
| 2015/0026623 A1 | 1/2015 | Horne |
| 2015/0031397 A1 | 1/2015 | Jouaux |
| 2015/0177964 A1 | 6/2015 | Spirer |
| 2015/0213497 A1 | 7/2015 | Jain et al. |
| 2015/0319470 A1 | 11/2015 | Tang et al. |

FOREIGN PATENT DOCUMENTS

| | | |
|---|---|---|
| WO | WO 2009/104921 | 8/2009 |
| WO | WO 2010/014461 | 2/2010 |
| WO | WO 2012/159004 | 11/2012 |
| WO | WO 2016/007972 | 1/2016 |
| WO | WO 2016/039987 | 3/2016 |

OTHER PUBLICATIONS

Poggi et al., Characterization of Workload and Resource Consumption for an Online Travel and Booking Site, 2010, IEEE, p. 1-10.*

Hasan et al., RFID-based Ticketing for Public Transport System: Perspective Megacity Dhaka, 2010, IEEE, p. 459-462.*

Zhang et al., An Extensible Framework for Internet Booking Application Based on Rule Engine, 2009, IEEE, p. 139-141.*

Ohwada et al., Unifying Constraint Satisfaction and Recommendation for Amusement Park Navigation, 2014, IEEE, p. 341-345.*

U.S. Appl. No. 14/788,713, John Cronin, Event-Based Content Delivery, filed Jun. 30, 2015.

U.S. Appl. No. 14/732,536, John Cronin, Target Local Wireless Transmission of Advertisements, filed Jun. 5, 2015.

U.S. Appl. No. 14/764,468, John Cronin, Ticket Upsell System, filed Jul. 29, 2015.

U.S. Appl. No. 14/838,750, John Cronin, User Content Display, filed Aug. 28, 2015.

PCT Application No. PCT/US2015/042496 International Search Report and Written Opinion mailed Oct. 29, 2015.

PCT Application No. PCT/US2015/046938 International Search Report and Written Opinion mailed Jan. 12, 2016.

U.S. Appl. No. 14/788,713 Office Action mailed Nov. 16, 2015.

U.S. Appl. No. 14/788,713 Final Office Action mailed Apr. 26, 2016.

U.S. Appl. No. 14/838,750 Final Office Action mailed Feb. 19, 2016.

Alt et al., Florian; "Adaptive User Profiles in Pervasive Advertising Environments", Pervasive Computing and User Interface Engineering Group, Specification of Software Systems, Marketing & Trade. Published Nov. 15, 2009.

AT&T Stadium Tickets—TicketMaster.

Bently, Frank; and Groble, Michael; "TuVista: Meeting the Multimedia Needs of Mobile Sports Fans", Motorola Applied Research and Technology Center. Proceeding MM '09 Proceedings of the 17th ACM International on Multimedia. Oct. 23, 2009.

"Casio Unveils Prototype of Visible Light Communication System Using Smartphones at CES", Casio Computer Co., Ltd., Jan. 10, 2012.

(56) References Cited

OTHER PUBLICATIONS

"Create Innovative SERVICES with PLAY APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Dawson, Keith; "LiFi in the Real World" All LED Lighting—Illuminating The Led Community, Jul. 31, 2013.
Devlin, Nick; "Samsung TV Unveils Soccer Mode" Football Technology—Samsung Launches Soccer Mode; BT EX., May 2, 2014. www.worldfootballinsider.com/Story.aspx?id=36898.
Ferre et al., P.; "Visualise: Enhancing the Spectator Experience", In International Consumer Electronics Show (CES) Conference, Las Vegas. pp. 1-5. Institute of Electrical and Electronics Engineers (IEEE) Jan. 10-14, 2009.
"Follow every play. Never miss another game" by GAMECHANGER. Date of Download: May 21, 2014 https://www.gamechanger.io/features/fans/gamestream.
"Generating metadata from acoustic and speech data in live broadcasting", IEEE Xplore Digital Library. Date of conference: Mar. 18-23, 2005, pp. ii/1145-ii/1148 vol. 2, ISSN: 1520-6149.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
"iBeacon—The Pioneer in Revolutinizing Retail Shopping", Mobile Technology, SPEC INDIA. Mar. 12, 2014.
Ichinose, Noriyoshi; "Mobile E-Ticket and E-Membership Services", NEC Journal of Advanced Technology, vol. 1, No. 3, Jul. 6, 2004.
"iSIGN to Preview New Smart Player Proximity Marketing Sysem at Digital Signage Expo 2014", OTC Disclosures & News Services, OTCMarkets.com, Feb. 4, 2014.
Kahn, Jordan; "GE integrates iBeacons in new LED lighting fixtures rolling out in Walmart & other retailers", 9TO5Mac Apple Intelligence. May 29, 2014.
Kounelis et al., I.; "Security of Service Requests for Cloud Based m-Commerce" MIPRO, 2012 Proceedings of the 35th International Convention. Date of Conference: May 21-25, 2012.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Lane, Nick; "Mobile geo-location advertising will be a big number in 2015", MobileSQUARED, Feb. 24, 2012.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
LiFi Overview—Green wireless mobile communication—LiFi Technology. Date of download: Jan. 16, 2014.
"Live Performance Data", Opta 2014. http://www.optasports.com/about/how-we-do-it/live-performace.aspx.
"Location Based Advertising on Mobile", IAB Moble, Internet Advertising Bureau UK. Apr. 30, 2012.
Montero, Eric, "Design and Implementation of Color-Shift Keying for Visible Light Communications", Sep. 2013, McMaster University.
"New and Improved In-Vendue Broadcast Service Coming to Nascar Tracks Beginning in Daytona", FANVISION. Feb. 17, 2012.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consotium (VLCC), Apr. 26, 2012.
Povey, Gordon, "VLC for Location, positioning and navigation", Jul. 27, 2011, http://visiblelightcomm.com/vlc-for-location-positioning-and-n . . . .
Romanov, Alex; "Proximity Marketing: Two Great Advertising Mediums Combined", Signage Solutions Magazine. May 17, 2011.
Smith et al., Julian; "Engaging the Mobile Shopper—Emerging Retail Mobile Marketing Opportunities", by Fetch F., May 2014.
"Sky News Arabia becomes the first installation of Astucemedia's new Data Platform Suite-Modular, Realtime_Graphics Workflow Solution", Astucemedia (http://astucemedia.com) Jun. 11, 2012.
"Standard Digital Signage Solution", Digital Signage Advertising and Interactive Solutions. Date of Download: Jul. 17, 2014 http://www.advertiseme.com.au/digital-signage/standardsolution/.
"Stats", Stats, SportVu, Player Tracking Technology. Http://www.stats.com/sportvu/sportvu.asp Date of download: Apr. 21, 2014.
Thanigavel, M.; "Li-Fi Technology in Wireless Communication", International Journal of Engineering Research & Technology (IJERT), ISSN: 2278-0181, vol. 2 Issue 10, Oct. 2013.
"The Data Collection Process", Opta 2014. http://www.optasports.com/about/how-we-do-it/the-data-collection-process.aspx.
"What We Do" by Fanmedia. Http://fanmedia.com/solutions/ Date of download: May 19, 2014.
Won, Eun Tae; "Visible Light Communication: Tutorial", Project: IEEE P802.15 Working Group for Wireless Personal Area Networks (WPANs), Mar. 9, 2008.
Xu et al., Changsheng; "A Novel Framework for Semantic Annotation and Personalized Retrieval of Sports Video", IEEE Transactions on Multimedia, vol. 10. No. 3., Apr. 2008.
PCT Application No. PCT/US2015/033613 International Search Report and Written Opinion mailed Sep. 1, 2015.
U.S. Appl. No. 14/838,750 Office Action mailed Oct. 19, 2015.

\* cited by examiner

Vendor Database

| Vendor ID | Location | Coupon Date | Coupon Deal |
|---|---|---|---|
| John's Bar | 400 Cornerstone Dr. | June 26, 2014<br>12:01 am – 11:59 pm | ½ Off Beer |
| Seth's Pub | 1410 Cornerstone Dr. | June 26, 2014<br>6:00 pm – 11:59 pm | Free Karaoke with Coupon |
| And Dim Sum | 123 Main St. | June 26, 2014<br>7:00 pm – 10:00 pm | 25% Off All Take-out Orders |
| . . . | | | |

Purchased Ticket/Parking Database

| ID | Ticket | End Location | Mode of Travel |
|---|---|---|---|
| ... | ... | ... | |
| 76 | A-7-30 | I-78 | Automobile |
| 77 | B-8-15 | Gate 7 | Foot |
| 78 | G-6-7 | 5th St. Subway Station | Subway |
| ... | ... | ... | |

SYSTEM TO OFFER COUPONS TO FANS ALONG ROUTES TO GAME

CROSS-REFERENCE TO RELATED APPLICATIONS

The present application claims the priority benefit of U.S. provisional application No. 62/048,936 filed Sep. 11, 2014 and entitled "System to Offer Coupons to Fans Along Routes to Game," the disclosure of which is incorporated herein by reference.

BACKGROUND

1. Technical Field

The present disclosure generally relates to route/traffic mapping. More specifically, the present disclosure relates to optimizing travel routes and providing coupons corresponding to vendors along the optimized travel route.

2. Description of the Related Art

Various methods for planning/mapping travel routes are generally known in the art. Such methods allow users to view, for example, real-time traffic conditions or optimized travel routes between a start position and an end destination. The planned/mapped route may provide different details based on, for example, a mode of transportation (i.e. by foot, car, public transportation). It may be possible that multiple routes can be illustrated for the user to view so that the user can select a particular route to use when traveling from the start position to the end destination.

Furthermore, a current position of the user can be monitored through the use of GPS (global positioning system). By using GPS, the current position of the user can be monitored at regular intervals in time. The method for planning/mapping travel routes can also provide updated travel routes, for example, if the user deviates from a planned path or new traffic-based information is received. The methods for planning/mapping travel routes can utilize the GPS information alongside any other available information in order to generate updated routes for the user to view.

Geolocation can also be used, for example with mobile phones, to monitor the current position of the user as well as the location of real-world objects. Whereas GPS may provide geographic coordinates (i.e. latitude/longitude), geolocation can be used to provide other details (i.e. street address) used to identify locations.

Advertisements are also known in the art. More specifically, businesses utilize various different types of advertisements mediums (i.e. signs) in order to attract attention of various onlookers. For example, a business (e.g., McDonalds) may provide information about a deal regarding one of their products on a sign that onlookers passing by may be able to see. In this way, there is a higher likelihood that the onlooker will be convinced to stop by the business and conduct one or more transactions (e.g., purchase food).

SUMMARY OF THE CLAIMED INVENTION

A method for planning a travel route and providing deals associated with the planned route is claimed. The method obtains travel-based information related to the user in order to generate various routes that can be used by the user to travel from an initial position to an end destination. Using the potential routes, information regarding applicable deals can be retrieved based on the location of the businesses (i.e. vendors) offering the deals. The potential routes and applicable deals available along each respective route are provided to the user to view.

A system for planning a travel route and providing deals associated with the planned route is claimed. The system includes a user device that allows users to view information about potential routes and applicable deals. The system also includes memory that stores information related to ticket information and applicable deals. Lastly, the system includes a processor that executes instructions stored in memory to obtain travel-based information related to the user in order to generate various routes that can be used by the user to travel from an initial position to an end destination. Using the potential routes, information regarding applicable deals can be retrieved based on the location of the businesses (i.e. vendors) offering the deals. The potential routes and applicable deals available along each respective route are provided to the user to view.

A non-transitory computer readable storage medium having embodied thereon a program executable by a processor to perform a method for planning a travel route and providing deals associated with the planned route is claimed. The method performed by the processor obtains travel-based information related to the user in order to generate various routes that can be used by the user to travel from an initial position to an end destination. Using the potential routes, information regarding applicable deals can be retrieved based on the location of the businesses (i.e. vendors) offering the deals. The potential routes and applicable deals available along each respective route are provided to the user to view.

DETAILED DESCRIPTION

The systems and methods as described in the present disclosure are directed towards embodiments for planning a travel route for a user (i.e. fan) who is planning to attend a sports game. The systems and methods will plan/map a route for the user from a start position (e.g., home) to the location of the sports game (e.g., stadium). Alongside the planned/mapped route, the systems and methods will also obtain various related deals (e.g., coupons) for one or more business (i.e. retail stores, fast-food) along the planned/mapped route. The various related deals can then be displayed for the user to view or use.

It should be noted that the following disclosure describes embodiments where users utilize the systems and methods to plan/map a route to a stadium and are provided with various deals along the route. There are other embodiments where the end destination is not limited to a stadium. In fact, there may be implementations of the systems and methods where any start location and any end destination can be used to generate a proposed route and related deals that the user may be interested in while traveling on the proposed route.

Figure 1:
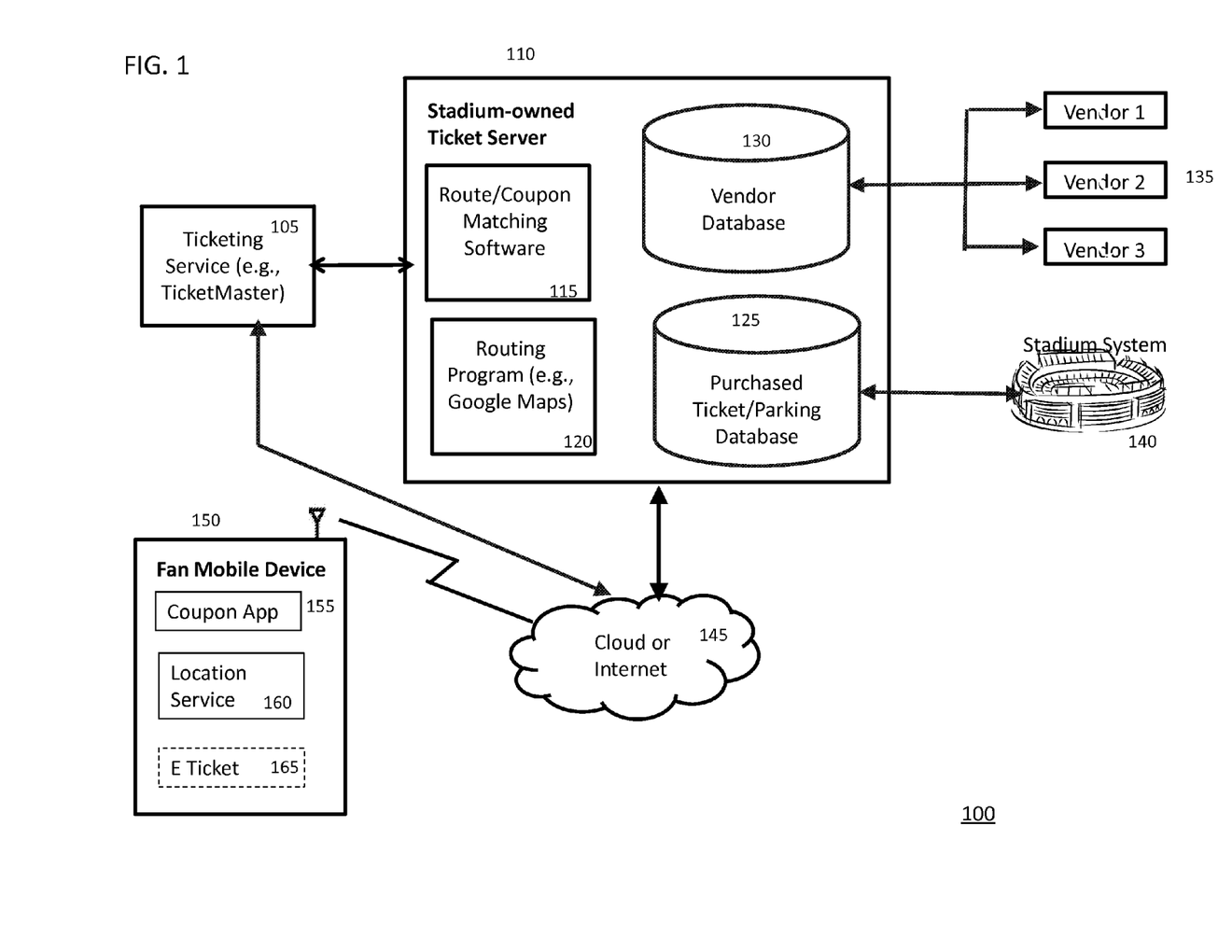
FIG. 1 illustrates a system for planning travel routes and offering related deals corresponding to the planned travel routes.

FIG. 1 illustrates a system 100 for planning travel routes and offering related deals corresponding to the planned travel routes. As noted above, the system 100 is capable of obtaining information related to various deals (i.e. coupons) that users may be interested for one or more business along the planned travel route between a start position and an end destination. In other embodiments, the system 100 may also implement other functionalities corresponding to the planned travel route. For example, the system 100 may allow the user to purchase game tickets (if available) from an online ticketing service (e.g., Ticketmaster) associated with the upcoming game at the end destination (e.g., stadium). The system 100 may also allow the user to purchase/reserve parking (if available) at the stadium using an online service associated with the stadium. Further details relating to the various elements of the system 100 are provided below.

The system 100 includes a variety of different elements including the ticket service 105, the stadium-owned ticket server 110, and the user device (e.g., mobile phone) 150. The various elements of the system 100 may all be connected to the cloud or Internet 145 through the use of respective communication modules (not shown). Communication with the cloud or Internet 145 by one or more of the elements of the system 100 may be performed using a variety of different wired and wireless methods known such as 3G, 4G, LTE, Wi-Fi and Bluetooth. It should be noted that other elements not described within the present disclosure or illustrated in the figured may also be incorporated into the system 100 in order to provide additional functionalities using the planned route or location of the user.

With reference to FIG. 1, the system includes a ticketing service 105. In some embodiments, the ticketing service 105 may be an online ticketing service (e.g., Ticketmaster). In other situations, the ticketing service 105 may be a way for a particular venue (e.g., stadium) to display and sell available tickets. For example, the ticketing service 105 may be used to display and sell available tickets to sporting events being hosted by the particular venue (e.g. stadium) that the user may purchase. In an embodiment, if the user designates stadium A as an end destination, the ticketing service 105 associated with stadium A may display all available tickets for events (e.g., sporting event, concert) that will be hosted at stadium A. The ticketing service 105 may provide information about the tickets (e.g., cost, seating) that can be viewed, for example, on the user device 150. The ticketing service 105 may also include processes/methods that facilitate completing a purchase transaction by the user for one or more tickets, for example, on the user device 150.

It should be noted that the ticketing service 105 may work alongside the ticket server 110 (described below). For example, the ticket server 110 may provide information, via the ticket/parking database 125, to the ticketing service 105 as to the number of tickets that are still available for purchase. The ticketing service 105 can then use that information to provide the available tickets that the user can view and purchase.

The system 100 of FIG. 1 also includes a ticket server 110. In an embodiment, the ticket server 110 may be associated (or owned) by a particular stadium. The ticket server 110 may be provided in the system 100 to facilitate in various different features such as selling tickets to attend events held at the stadium, sell and reserve parking spaces for users attending the event at the stadium, providing directions from a user location to the stadium or to provide various deals (e.g., coupons) from nearby businesses (e.g., vendors). To facilitate the various different features, the ticket server 110 may include different modules/processors associated with the ticket server 110 directed at one functionality. For example, the ticket server 110 includes a route/coupon matching software 115, routing program 120, ticket/parking database 125 and vendor database 130. Further details about each of the modules/processors (as illustrated in FIG. 1) are provided below. In some embodiments, the ticket server 110 may have modules/processors that incorporate multiple different functionalities as well as other modules/processors that add different functionalities not described herein.

The route/coupon matching software 115 facilitates the ticket server 110 with matching information pertaining, for example, to deals (i.e. coupons) to the users. More specifically, based on a particular router the user is traveling on to go from their starting position to the end destination (e.g., stadium), certain deals may be more desired. For example, if a given route has various fast-food restaurants, the ticket server 110 may provide any relevant deals (e.g., coupons) related to those fast-food restaurants for the user to view, for example, on their user device 150. In some embodiments, the relevant deals (e.g., coupons) may not be only restricted to the planned route by the routing program 120. For example, the user may be capable of indicating what types of deals the user is interested in and related deals can then be provided independent of the planned route. In another embodiment, the user may select a general radius outside of the planned route to have deals provided as well. In this way, the user may know what else is available nearby and take detours as needed to make use of the deals the user is interested in.

It should be noted that what deals are included in the route/coupon matching software 115 may depend, for example, on the ticket server 110 and the relationship of the party who owns the ticket server 110 (e.g., stadium) and nearby businesses. For example, the owner of the ticket server 110 (e.g., stadium) may wish to include the deals of some businesses through some sort of negotiated sponsorship/contract-based relationship. The details regarding what types of deals are included may be different for each embodiment of the ticket server 110. How each party (e.g., local businesses and the stadium) agrees to utilize the ticket server (e.g., business contracts) is considered outside the scope of the present disclosure.

The routing program 120 of the ticket server 110 plans or optimizes travel routes for the user from the current position of the user to desired end destination (e.g., the stadium). The routing program 120 may operate in a similar manner as other existing routing methods such as Google Maps and Waze. The routing program 120, for example, may provide a planned travel route for the user, for example, based on a shortest route or the fastest route (in situations where traffic information is available). The planned route may be displayed on the user device 150 so that the user can view the route and drive accordingly. Alongside the planned route, additional information such as local businesses and traffic information can also be displayed on the user device 150.

In some embodiments, the planned route by the routing program 120 may provide a route based on user input/settings. For example, the user may dictate special conditions that can influence the planning of the route by the routing program 120. For example, the user may indicate that no high-ways or toll roads can be used to travel to the end destination. In another example, the user can specify the type of transportation (e.g., subway, bus, bike). In another embodiment, the route/coupon matching software 115 can adjust the planned route by the routing program 120 so that the user can travel to one or more businesses that have applicable deals (e.g., coupons). Furthermore, the user can also indicate that particular locations (or genre of businesses) also be provided along the planned travel route (e.g., gas station).

The ticket and parking database 125 includes various types of stadium-related information that can be used by the ticket server 110. The ticket and parking database 125 may be different based on, for example, the associated stadium that owns the ticket server 110. For example, the ticket and parking database 125 may include information containing available tickets associated with an event held at the stadium. The ticket information may include what tickets are available, which tickets have been sold, who owns each ticket and where each ticket holder may be seated within the stadium. Specific details, for example, about the events held at the stadium, available tickets, and parking are provided to the ticket server 110 by accessing the stadium system 140 associated with the stadium.

The ticket and parking database 125 may also include parking-related information for the stadium 140. For example, users may be capable of reserving parking spots (or a spot within a parking section) via the ticket server 110. In some cases, the user can pay for parking before arriving at the stadium using the ticket server 110 potentially bypassing any sort of line or system at the stadium for purchasing/reserving parking spots on-site.

Other types of information may also be included in the ticket and parking database 125. For example, information about how to get to the parking spot (travel directions, subway stops) or particular seats (section, gate number) can be included. Visual displays/images (e.g., maps) can be provided by the ticket server 110 to be displayed on the user device 150 for the user to view. These types of information may work alongside the routing program 120 in planning a travel route for the user to take.

The vendor database 130 includes information about the various vendors 135 (i.e. businesses) that the ticket server 110 may provide deals (e.g., coupons) to users along the planned route. The vendors 135 can include various businesses around the stadium. For example, such vendors 135 may include food, sport-based merchandise, and dry-cleaning. The vendor database 130 may also include information such as the deals (e.g., coupons) that users may be provided, when the deals are available and what conditions users must agree to in order to use the deals. For example, coupons for particular food or sport-based merchandise can be provided for the user to use to buy the specified item at a discount. The vendor database 130 may also include information about each of the vendors including where they are located (address).

As noted above, the vendors 135 associated with the vendor database 130 may be based on relationships between the stadium and the vendors 135. The terms that dictate what vendors 135 and what deals are included within the vendor database 130 to be provided to the user through the ticket server 110 may be based on agreements between the stadium and vendors 135.

The user device (i.e. fan mobile device) 150 is associated with each user interacting with the system 100 of FIG. 1. Exemplary user devices 150 may include smartphones and tablets. The user device 150 is capable of communicating with the ticketing service and/or ticket server 110 via a communication module (not shown) that uses, for example, the cloud or Internet 145. As noted above, such communication can be performed, for example, via 3G, 4G, LTE, or Bluetooth.

The user device 150 may itself include a variety of different functionalities (e.g., applications, modules) that can be used to facilitate the overall system 100 (e.g., ticket server 110). For example, the user device 150 may include a coupon application 155 that can be used to obtain routes suggested by the routing program 120 and the deals provided by the route/coupon matching software 115 of the ticket server 110. The coupon application 155 may be an application that can be downloaded, for example, from the ticket server or some other third party provider to be installed and operated on the user device 150. The coupon application 155 may display the related information onto the user device 150 for the user to view. The coupon application 155 may include settings that can allow users to provide user input (e.g., customized preferences) that could tailor planned paths or available deals provided from the ticket server 110 to the user.

The location service 160 of the user device 150 can be used to determine the current location of the user. For example, GPS may be used alongside the location service 160 to determine where the user is. In this way, the routing program 120 of the ticket server 110 can plan an appropriate travel route to the stadium. In other embodiments, geolocation can be used to determine where the user is and how the user should proceed to travel to the stadium.

With the planned travel route, appropriate deals (e.g., coupons) can also be provided to the user. The location service 160 may also store pre-set start positions associated with a particular user. For example, the user may wish to store certain regularly used start positions (e.g., home address, work address) so that the user does not need to manually input the address multiple times thereby reducing the potential error in inputting the address wrong or improving efficiency (e.g., user is a slow inputter).

Lastly, the user device 150 may include an e-ticket application 165 that stores one or more electronic tickets that the user has purchased and stored on the user device 150. The e-ticket application 165 can be used to display the purchased ticket on the user device 150. The e-ticket displayed may contain, for example, a barcode that can be scanned to provide the user admission into the stadium to attend the event. The e-ticket may also display other information such as the owner of the ticket, date and time of the event, and seating location associated with the ticket.

Figure 2:
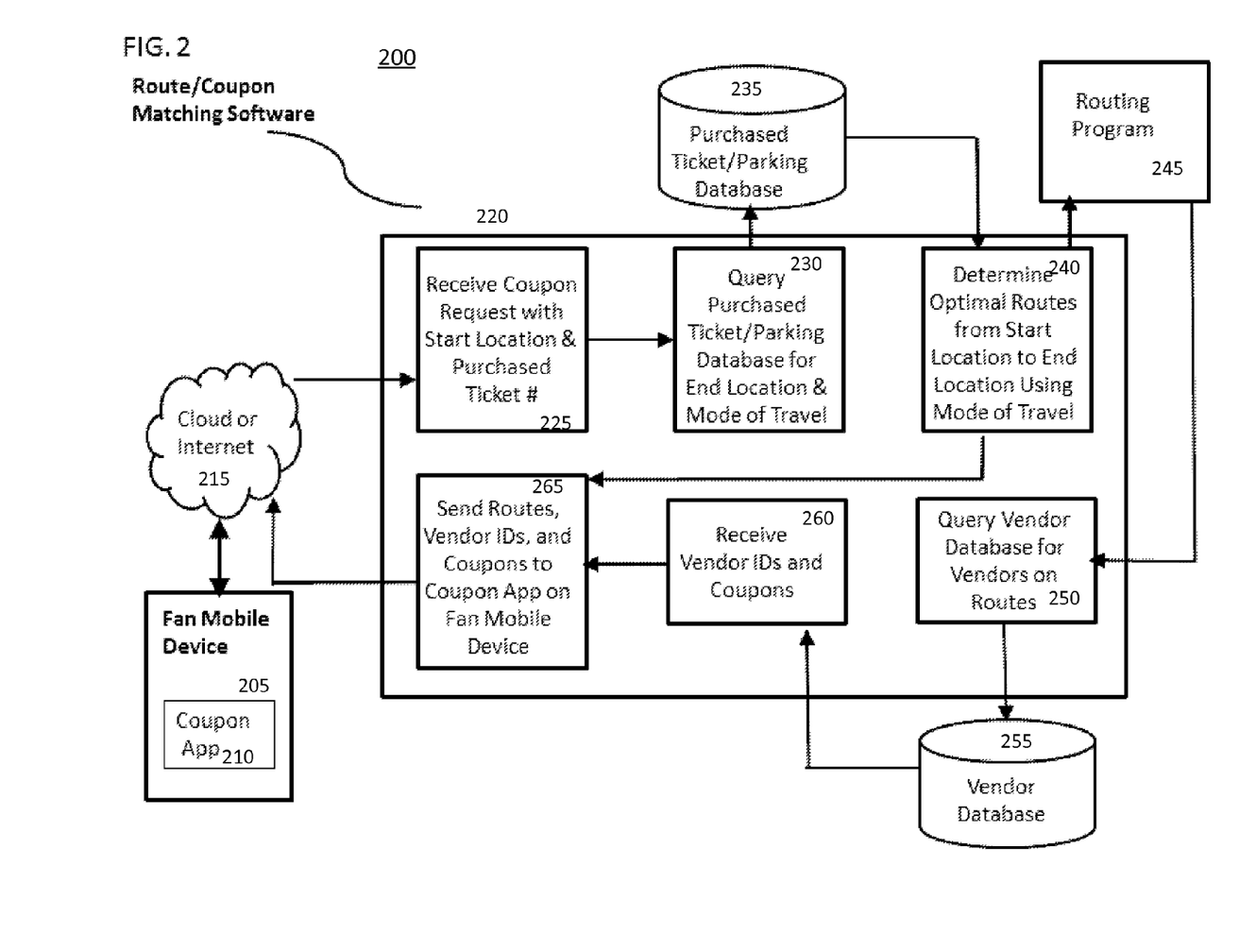
FIG. 2 illustrates the route/coupon matching software.

FIG. 2 illustrates the route/coupon matching software 200. More specifically, the route/coupon matching software 200 encompasses a number of steps (as illustrated in the figure) that facilitates matching a planned travel route with one or more deals (e.g., coupons) for the user to view on their user device. It should be noted that the following disclosure (and FIG. 2) may illustrate a sequential set of steps for the software 200 to perform. There may be alternative ways (i.e. different order of steps) for the route/coupon matching software 200 to perform the functionality for matching a travel route with available deals (e.g., coupons) for the user.

As described above, the user device (e.g., smart phone) 205 may be used by the user to view one or more deals associated with a planned route from a starting position to the end destination (e.g., stadium). The user can view any available deals on their user device via the coupon application 210.

The coupon application 210, as described in FIG. 1, interacts with the ticket server (i.e. the route/coupon matching software 220) to obtain the deals associated with the planned path the user will take to go to the stadium. Communication between the user device 205/the coupon application 210 and the route/coupon matching software 220 is facilitated through the use of the cloud/Internet 215.

It should be noted that the coupon application 210 may also allow users to specify additional conditions that can customize what types of deals or routes the user would like to take. For example, the coupon application 210 may include a graphical user interface (GUI) that provides the ability for the user to select one or more different preferences of deals to view. The user may also provide a start position or a particular path (from a plurality of possible paths) to use in order to travel to the end destination (e.g., stadium).

In step 225, the route/coupon matching software 220 receives information from the user device 205 of the user. Some information that may be obtained for use by the route/coupon matching software 220 may include a request for coupons associated on a planned route, a user start location and information regarding the ticket(s) purchased by the user.

Once the information is received from the user device 205, the route/coupon matching software 220 can then begin querying the ticket/parking database 235 (as described in FIG. 1) for route/coupon-based information that the user may be interested with. The ticket information obtained from the user device 205 may inform the route/coupon matching software of the end destination (e.g., stadium) that the user would be traveling too.

The user may also provide, at this time, information pertaining how the user intends to travel to the stadium. For example, the user may indicate that the user is driving or taking public transportation. Based on the mode of transportation, different instructions for routes can be provided. For example, if travel involves the use of subways, various stops and schedules of the trains can be provided. If the user is driving, traffic-based information (e.g., accidents, construction, detours) can be provided to better inform the user how to get to the stadium.

After querying the purchased ticket/parking database 235, the route/coupon matching software 220 can subsequently determine an optimal route from the start position (e.g., current position of the user) and the end destination (e.g., stadium) for a particular mode of transportation that the user provided in step 240. A default mode of travel can be set (e.g., by car) with the route/coupon matching software 220 and users may be capable of providing customized default mode of transportation via their user device 205. The travel route may be generated by the route/coupon matching software 220 along with assistance from the routing program 245. The routing program 245, as described above, may be any sort of already existing routing program (e.g., Waze, Google Maps) that can provide one or more potential routes between the start position and end destination. The potential routes may be constantly updated based on updated information about the user (e.g., updated locations, mode of transportation) and the different routes (e.g., traffic).

In step 250, the routing program 245 queries the vendor database 255 for one or more vendors on the potential routes generated in step 240. The vendor database 255 may include the various vendors who participate in the coupon program whereby the route/coupon matching software informs users of various deals offered by the vendors traveling, for example, to the stadium.

As noted above, the vendor database 255 may include information about each of the businesses offering deals (e.g., coupons) to users through the route/coupon matching software 220. The information may include the location of the businesses and specific details about the deals such as conditions on when and how the deals can be used.

Based on the possible routes generated in step 240 and the available deals obtained in step 250 from the vendor database 255, the route/coupon matching software 220 can obtain the relevant information regarding businesses along the possible routes and applicable deals (e.g., coupons) for the user in step 260. In an embodiment, step 260 may obtain all relevant information regarding businesses and applicable deals for the optimal or user chosen route.

In other embodiments, the route/coupon matching software 220 can obtain information regarding business and applicable deals (via step 260) associated with a route and also based on user preferences. The user can provide preferences, for example, what type of businesses and/or deals should be provided. These businesses and/or deals may be provided regardless of whether they are associated with a possible or chosen route. In another embodiment, the businesses and/or deals may be displayed within a surrounding area defined by a route and/or location of the user (e.g., 1 mile radius). The user can also provide preferences, for example, indicating types of businesses and/or deals that should not be displayed. This may address situations where the user is not interested in any sort of deals or businesses of a certain type (e.g., the user wishes to avoid all fast-food places).

Once a route has been generated and chosen (via step 240) and information for corresponding businesses and/or deals associated with the route have been obtained (via step 260) by the route/coupon matching software 220, the chosen route and information about the businesses and/or deals can then be provided to the user device 205 in step 265. The route/coupon matching software 220 can transmit the route and/or information about the deals using, for example, the cloud or Internet 215. The information can then be displayed, for example, on the user device 205 for the user to view via the coupon application 210.

In some embodiments, the route/coupon matching software 220 can continue to monitor the current location of the user via GPS elements associated with the user device 205. Based on the user location, the route/coupon matching software 220 can update routes (via step 240) and/or information regarding businesses and deals (via step 250-260) to be provided to the user on the user device 205 (via step 265). This updated information can be provided to the user device 205 at regular time intervals. The frequency of update (e.g., every 5 minutes) can be a feature that a user can customize through the coupon application 205.

Figure 3:
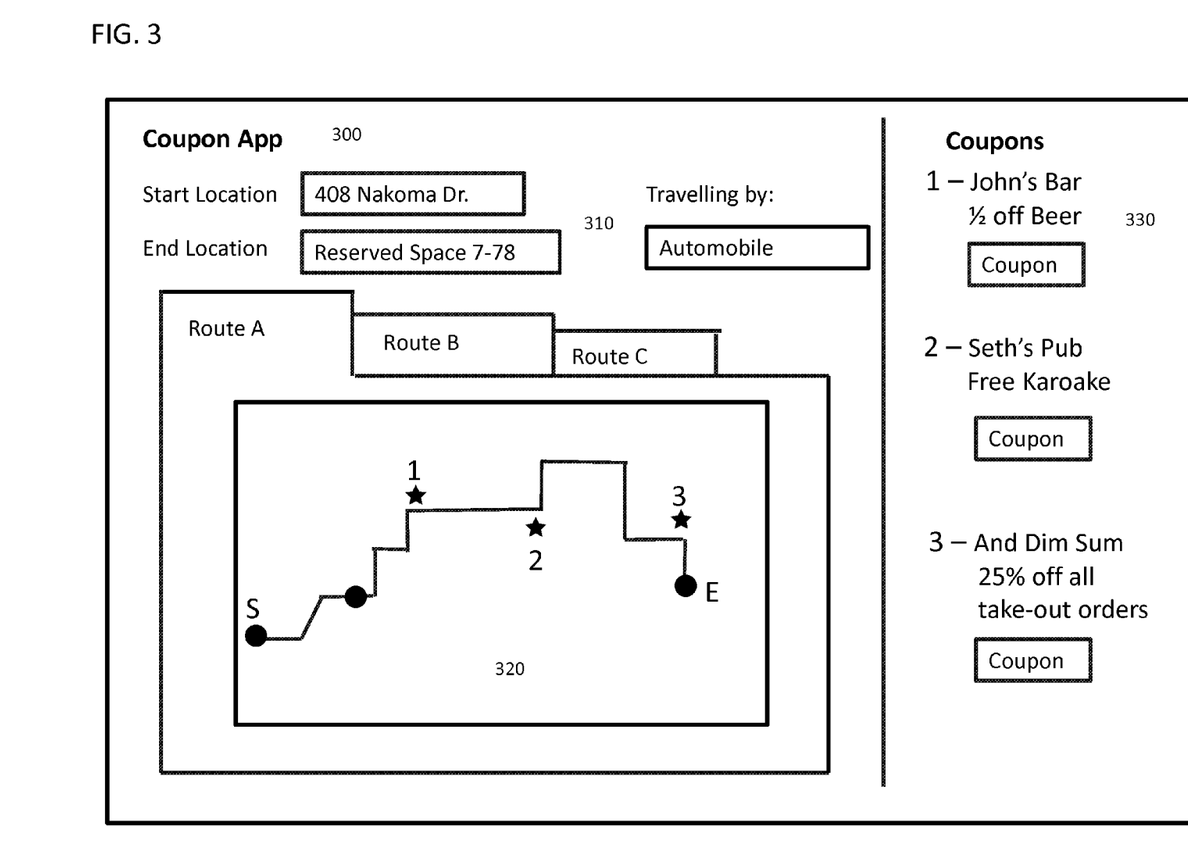
FIG. 3 illustrates the coupon application.

FIG. 3 illustrates the coupon application 300. The coupon application 300 may be downloaded and run on a user device. The coupon application 300 may be downloaded, for example, from an application store (e.g., Apple Store) or a website. In an embodiment, the coupon application 300 may contain features compatible for a particular ticket server (or stadium). As noted above, the coupon application 300 facilitates the user in obtaining a route that the user can use to travel to the stadium and subsequently obtain related deals for businesses along the route.

The coupon application 300 includes user input directed at determining an optimal route for the user to use in order to travel to, for example, the stadium (see 310). For example, the coupon application 300 may have user input options for the user to provide a starting location (e.g., where the user may be currently, home location), an end location (e.g., stadium location, reserved parking location) and a mode of travel (e.g., car, public transportation, bike).

In some embodiments, some of this information may automatically be obtained without the need for user input. For example, the start location may be obtained from GPS elements associated with the user device. The end location may also be automatically determined, for example, based on the e-ticket information or if the coupon application is compatible with a particular ticket server associated with a particular stadium. The mode of travel may also have a default value (e.g., automobile).

Once the user inputted the route information, the coupon application can display one or more routes (e.g., route A, route B, route C) 320 that the user can use to travel from the start location to the end destination identified in 310. The routes may be displayed 320 using separate tabbed windows where the user can select one particular route to view. In some embodiments, two or more routes can simultaneously be displayed within the same display so that the user can compare and contrast which route to travel on.

With the displayed route 320, the user can view an illustrated route as generated by the ticket server (via the routing program and route/coupon matching software). The illustrated route can indicate how the user should proceed to arrive at the end destination. In some embodiments, the displayed route 320 may also provide instructions (e.g., audio, text) for the user to maintain traveling on a chosen route.

Alongside the display route 320, information regarding the businesses and/or deals can also be provided to the user. As illustrated in the coupon application 300, the businesses and/or deals may be indicated on the display route 320 using an icon (e.g., star) indicating the location of applicable deals that can be used by the user traveling along the chosen route. If there are a plurality of different routes that are possible (e.g., route A, route B, route C), there may be situations where the businesses and/or deals indicated on the display route 320 can be different. Furthermore, the user is able to have the coupon application 300 display all applicable businesses and/or deals, for example, within a general radius of the user location despite note being associated with a particular display route 320.

In any case, the businesses and/or deals indicated on the display route 320 can be provided to the user. This information on the display route 320 can influence which route the user can choose to take. The information can also facilitate planning, by the user, of any stops that may be taken on their way to the stadium. In an embodiment of the present disclosure, the coupon application 300 may provide information regarding a suggested departure time that the user should abide by in order to arrive at the destination at a specific time (e.g., 15 min before game time). The indication of one or more stops to partake in one or more deals can instruct the coupon application 300 to adjust the departure time accordingly so that the user can still maintain the arrival time. In another embodiment, the arrival time can also be adjusted accordingly based on indicated stops by the user to use the one or more deals.

The coupon application 300 provides information about each of the businesses and/or deals viewable on the display of the user device 330. The information about the applicable businesses and/or deals can correlate with the business and/or deals indicated on the one or more possible routes in the display route 320. In some embodiments, the information about applicable businesses and/or deals may display all participating businesses and/or deals non-related to a particular route (e.g., all possible businesses and/or deals stored in the vendor database).

For one or more applicable deals, the user may be capable of viewing details about a particular deal (e.g., ½ off purchase, free stuff). The user can also select which deals the user would like to use by interacting with the 'coupon' button. Upon selection of the 'coupon' button, the coupon application 300 may provide a 'coupon' that can be used at the particular business to redeem the deal. The 'coupon' may be unique to the particular user. For example, the coupon application 300 may provide for example, an alpha-numerical code to be provided at the business, a replica of a coupon that can be printed out, or a barcode that can be shown/scanned at the business to redeem the deal. In situations where the deal is not redeemable (e.g., out of inventory, outside allowed time frame), the 'coupon' button may not be selectable or the entry for the deal may be removed from the coupon application.

Figure 4:
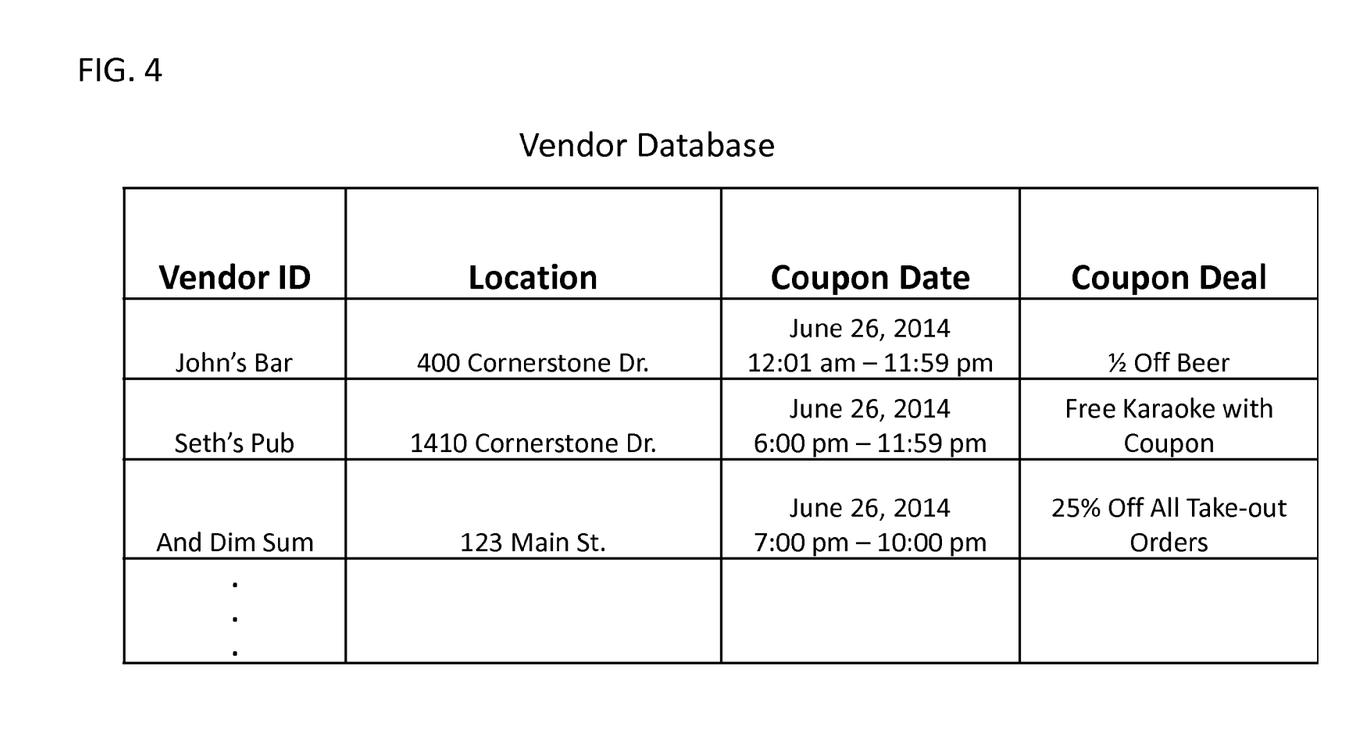
FIG. 4 illustrates the vendor database.

FIG. 4 illustrates the vendor database. The vendor database includes information for each business that participates with the ticket server (as illustrated in FIG. 1) in providing one or more deals to various users that may potentially pass by while traveling. The information in the vendor database can be useable by the ticket server (e.g., route/coupon matching software) to determine what vendors (i.e. businesses) are found on a particular route that the user may travel on and if there are any applicable deals that can be provided to the user to view.

The vendor database can include information including the identification of all participating businesses, where a particular business is located (e.g., street address), when available deals (e.g., coupons) the business is offering and conditions that the deal is redeemable (e.g., date and time). It should be noted that other types of information may be included in the vendor database as well. For example, if a deal is limited to a number of redeemable users (e.g., limited inventory), the vendor database may indicate how many users have redeemed the deal and/or the remaining inventory or stock that can be used.

Figure 5:
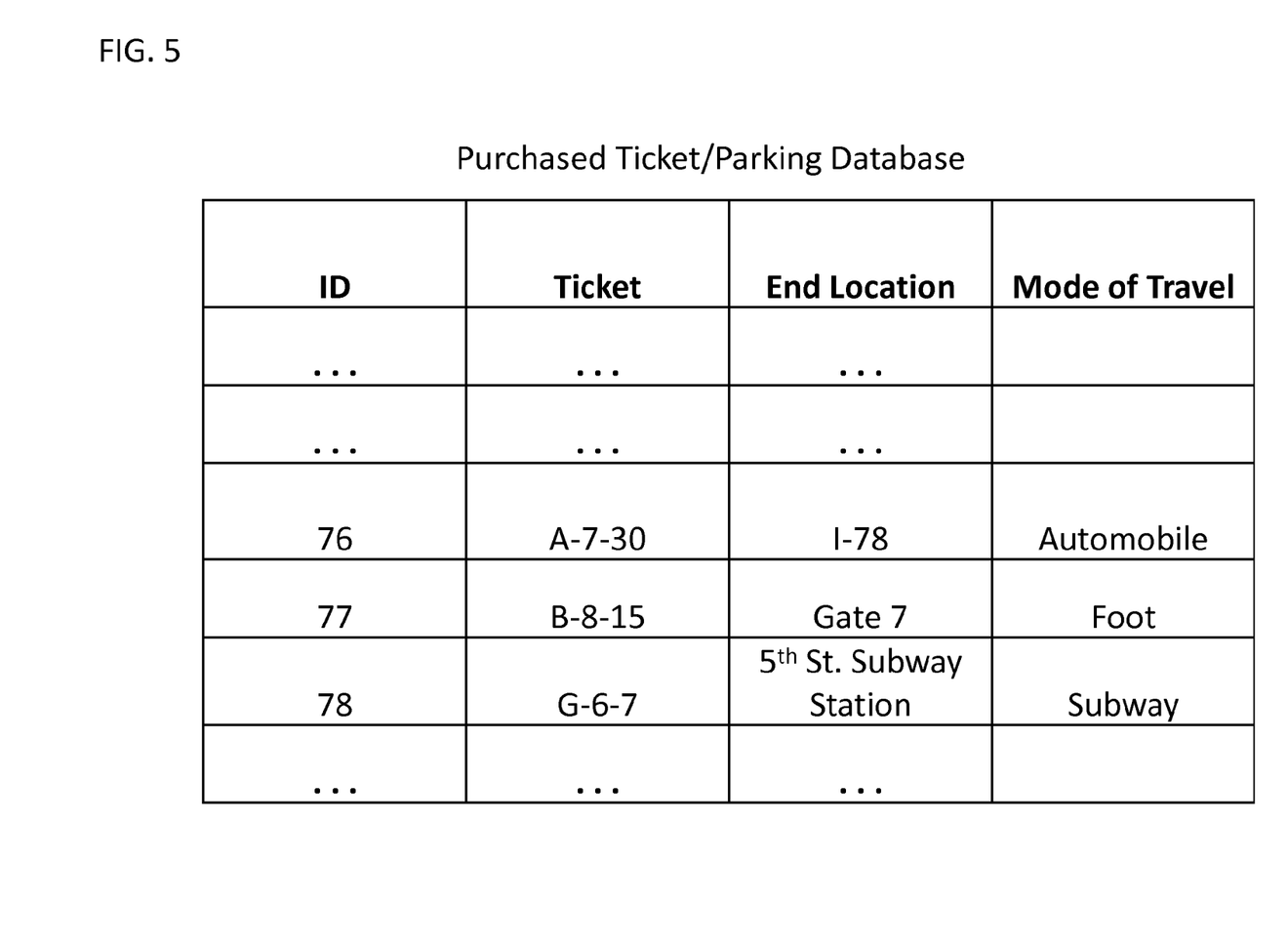
FIG. 5 illustrates the ticket/parking database.

FIG. 5 illustrates the ticket/parking database. The ticket/parking database includes information for each ticket that has been purchased. The ticket/parking database may also include information, at least for the purchased tickets, a corresponding user that purchased the ticket and seating location associated with the ticket. Using the seating location, the ticket/parking database can be referenced by the ticket server to provide directions for the user on how to arrive at the stadium where the seat is located. For example, if the stadium has multiple gates and sections, the end location identified in the ticket/parking database may be the closest gate and section corresponding to the seat associated with the ticket.

The type of directions provided to the user may also be dependent on the type of transportation the user intends to use to arrive for the event. For example, the end location may correspond to a particular parking location (if the user arrives via automobile) or station/stop (if the user arrives using public transportation). The directions can use the end location accordingly based on the mode of transportation chosen by the user. It should be noted that the ticket/parking database may store the user preference as to the mode of transportation in the database. The preference as to the type of transportation may be set as a default (e.g., automobile) and the user can inform the ticket server otherwise thereby changing the entry in the ticket/parking database.

Other types of information may also be stored in the ticket/parking database. For example, information about the event associated with the ticket can be stored (e.g., date and time of the event). In some embodiments, the tickets that have not been purchased may also be stored in the ticket/parking database. The non-purchased ticket information can be provided, for example, to a ticketing service that facilitates sale of unsold tickets. In fact, once a ticket that has been sold at the stadium or through the ticketing service, the information can be updated accordingly into the ticket/parking database. Therefore, users who purchase a ticket (e.g., online through a ticketing service or in person at the stadium) may be asked to provide information such as their name (to associate with the purchased ticket) and intended mode of transportation.

Figure 6:
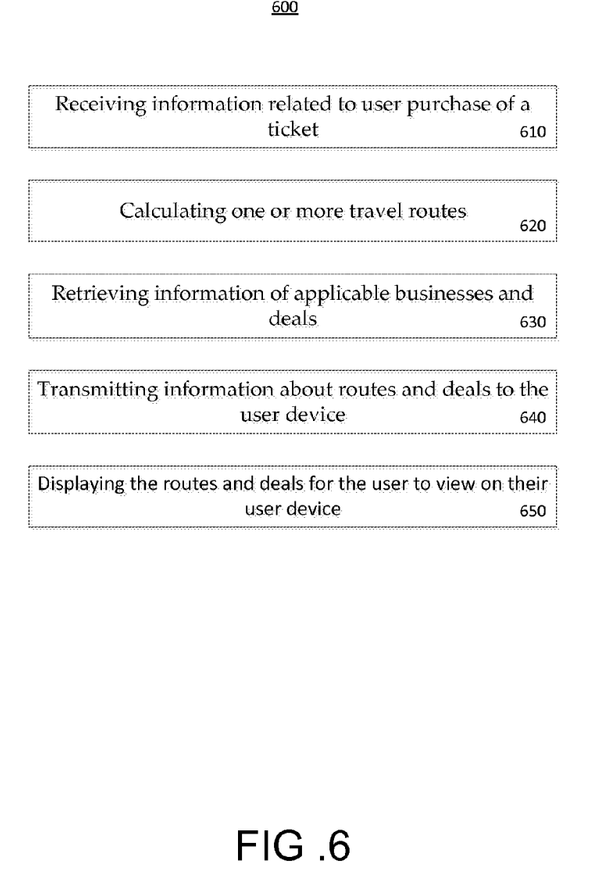
FIG. 6 illustrates the method for planning travel routes and offering related deals corresponding to the planned travel routes.

FIG. 6 illustrates the method 600 for planning travel routes and offering related deals corresponding to the planned travel routes. More specifically, vendors participating with the ticket server associated with a stadium may be capable of advertising various deals for users traveling to the stadium to attend an event (e.g., sports game). The ticket server can generate one or more routes for the user to use to travel to the stadium and along those routes provide any deals that the user may be interested in. In some cases, the user can select a route that contains a particular deal that other routes do not have. In this way, vendors can utilize the method as a form of advertisement on days where there are many different users traveling to the same location (e.g., stadium).

In step 610, the ticket server retrieves information relating to purchased tickets. The ticket-based information may be stored, for example, in the ticket/parking database. The ticket/parking database may be associated with a particular stadium hosting the event that the ticket corresponds to. The information related to the purchased ticket can be obtained from the database by searching for a corresponding user identified with the ticket (e.g., the buyer, user identification).

Information obtained about the purchased ticket may include, for example, where the user should go (e.g., seat location, parking location, stadium location), when the event is occurring and intended mode of transportation. These types of information can later be used to influence how the routing program and/or route/coupon matching software generates and displays routes and corresponding deals for the user to view through their user device (via the coupon application). For example, different routes may be provided based on, for example, the mode of transportation, the time of day (e.g., traffic-based information), or operating hours for businesses.

In step 620, the ticket server (via the routing program) can generate one or more routes for the user to use to travel to the stadium. More specifically, embodiments may allow the user to specify a start location and/or end destination (e.g., stadium, parking lot) that can be used to generate the routes. In some embodiments, the start location and/or the end destination (i.e. end location) may be obtained automatically. For example, the start location may be obtained from a user profile (e.g., home address) or GPS location. The end destination may be obtained, for example, from ticket-based information (e.g., location of the event, reserved parking lot).

In some embodiments, the user may further influence the type of routes that are generated by the routing program by providing user-based preferences. For example, the user can provide restrictions where the user would not like to travel (e.g., avoid toll roads, highways). The user can also provide preferences as to what type of businesses the user would like to travel by (e.g., fast food, retail stores, gas station) on the way to the stadium. There may also be an option that allows the user to adjust already generated routes by the routing program displayed on the user device. The user can propose alternate routes or a completely different route altogether by inputting (e.g., manually) changes in the routes. For example, a portion of a generated route between two points can be repositioned to take a different path instead.

Based on the proposed routes by the routing program, the ticket server can obtain applicable information for businesses and deals from the vendor database in step 630. The vendor database, as noted above, includes the information of all applicable businesses (e.g., vendors) and deals (e.g., coupons) that may be provided to the user traveling to the stadium. Deals associated with businesses located on a proposed route can be retrieved and provided to the user to view.

In some embodiments, the user can indicate what types of deals should always be shown or never shown. In this way, regardless of the location of the business, the corresponding deal can be transmitted or not based on the user preference. In another embodiment, the user may specify that deals arising from businesses within a general vicinity (e.g., 2 blocks, 0.25 miles) of the proposed route or user location can be also displayed.

In step 640, the proposed routes and the information about applicable businesses and deals can be transmitted from the ticket server to the user device. The information that is transmitted to the user via step 640 can be updated and retransmitted to the user on a regular basis (e.g., every 5 minutes) or based on a condition (e.g., close of business, updated user location).

In step 650, the proposed routes and information about applicable businesses and deals can be displayed on the user device for the user to view. These information can be displayed via an application that the user can download, install and run on the user device. The user is capable of selecting a particular route and viewing directions on how to travel from the user current location to the stadium. The user can then view applicable deals along the proposed route. By selecting one or more deals, the user is provided information about when and how to redeem the deal. In this way, businesses may be provided additional avenues of advertisement for their goods and/or services which may attract additional customers who are traveling to attend an event at the stadium.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

It should be noted that the technology can be used in a variety of different events and venues including entertainment or cultural events presented at a theater, gymnasium, stadium or other facility involving a group of people. Such events may also include a variety of sporting events such as football (American and global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as museums or historic homes.

What is claimed is:

1. A method for travel and deal planning, the method comprising:

retrieving, via a ticket server, travel-based information related to a purchased ticket, wherein the travel-based information includes a start location and an end destination, the end destination corresponding to a location that is hosting an event associated with the purchased ticket;

generating, by the ticket server, one or more travel routes, wherein each of the one or more generated travel routes includes directions that can be followed by a user in order for the user to travel from the starting location to the end destination;

retrieving, by the ticket server, deal coupon information relating to applicable deal coupons for a plurality of businesses, the plurality of businesses each located within a predetermined vicinity limit of points along at least one of the one or more generated travel routes; and transmitting, by the ticket server, the one or more generated potential travel routes and the retrieved deal coupon information to a user device associated with the user, wherein the user device thereby displays at least the generated travel routes and the applicable deal coupons.

2. The method of claim 1, wherein the purchased ticket is for a sporting event, and wherein the location corresponding to the end destination is a stadium that is hosting a sporting event.

3. The method of claim 1, wherein the one or more generated travel routes further includes traffic-based information.

4. The method of claim 1, wherein the deal coupon information includes conditions defining when and how the deal can be redeemed.

5. The method of claim 1, further comprising retrieving user preferences for routes that dictate how the one or more travel routes are generated.

6. The method of claim 1, further comprising retrieving user preferences for deal coupons that dictate what types of applicable deal coupons are retrieved or not retrieved.

7. The method of claim 6, wherein the user preferences for deal coupons identify the predetermined vicinity limit, the predetermined vicinity limit defined by one or more numeric values, the one or more numeric values including a number of blocks, a distance value, or some combination thereof.

8. The method of claim 1, further comprising:
updating the one or more travel routes;
retrieving new deal coupon information relating to new applicable deal coupons based on the updated one or more travel routes; and
transmitting the updated one or more travel routes and the new deal coupon information to the user device.

9. A system for travel and deal planning, the system comprising:
a communication transceiver that is communicatively coupled to a user device that is associated with a user;
a memory; and
a processor coupled to the memory and to the communication transceiver, wherein execution of instructions stored in the memory by the processor:
retrieves travel-based information related to a purchased ticket, wherein the travel-based information includes a start location and an end destination, the end destination corresponding to a location that is hosting an event associated with the purchased ticket,
generates one or more travel routes, wherein each of the one or more generated travel routes includes directions that can be followed by a user in order for the user to travel from the starting location to the end destination,
retrieves deal coupon information relating to applicable deal coupons for a plurality of businesses, the plurality of businesses each located within a predetermined vicinity limit of points along at least one of the one or more generated travel routes, and
transmits the one or more generated potential travel routes and the retrieved deal coupon information to a user device associated with the user, wherein the user device thereby displays at least the generated travel routes and the applicable deal coupons.

10. The system of claim 9, wherein the purchased ticket is for a sporting event, and wherein the location corresponding to the end destination is a stadium that is hosting a sporting event.

11. The system of claim 9, wherein the one or more generated travel routes further include traffic-based information.

12. The system of claim 9, wherein the deal coupon information includes conditions defining when and how the deal coupon can be redeemed.

13. The system of claim 9, wherein the processor further retrieves user preferences for routes that dictate how the one or more travel routes are generated.

14. The system of claim 9, wherein the processor further retrieves user preferences for deal coupons that dictate what types of applicable deal coupons are retrieved or not retrieved.

15. The method of claim 14, wherein the user preferences for deal coupons identify the predetermined vicinity limit, the predetermined vicinity limit defined by one or more numeric values, the one or more numeric values including a number of blocks, a distance value, or some combination thereof.

16. The system of claim 9, wherein the processor further:
updates the one or more travel routes,
retrieves new deal coupon information relating to new applicable deal coupons based on the updated one or more travel routes, and
transmits the updated one or more travel routes and the new deal coupon information to the user device.

17. A non-transitory computer readable storage medium having embodied thereon a program executable by a processor to perform a method for travel and deal planning, the method comprising:
retrieving, via a ticket server, travel-based information related to a purchased ticket, wherein the travel-based information includes a start location and an end destination, the end destination corresponding to a location that is hosting an event associated with the purchased ticket;
generating, by the ticket server, one or more travel routes, wherein each of the one or more generated travel routes includes directions that can be followed by a user in order for the user to travel from the starting location to the end destination;
retrieving, by the ticket server, deal coupon information relating to applicable deal coupons for a plurality of businesses, the plurality of businesses each located within a predetermined vicinity limit of points along at least one of the one or more generated travel routes; and
transmitting, by the ticket server, the one or more generated potential travel routes and the retrieved deal coupon information to a user device associated with the user, wherein the user device thereby displays at least the generated travel routes and the applicable deal coupons.

* * * * *